United States Patent Office 3,632,819
Patented Jan. 4, 1972

3,632,819
BENZOYLATION OF INDOLES
Silvio Maffei and Franco Tosi, Chiasso, Switzerland, assignors to Biochefarm S.A., Chiasso, Switzerland
No Drawing. Filed Oct. 25, 1968, Ser. No. 782,501
Int. Cl. C07d 27/56
U.S. Cl. 260—326.13 A
2 Claims

ABSTRACT OF THE DISCLOSURE

The arylation of indole derivatives is effected by reacting a mixed anhydride of a benzoic acid optionally substituted by a halogen atom and of a monoester of a carbonic acid, with an indole derivative. A process for preparing said new mixed anhydrides is also provided.

---

The present invention relates to arylation processes and more particularly arylation of indole derivatives.

The arylation of indole derivatives is generally effected by the action of acid chlorides on metal derivatives of heterocyclic nitrogen compounds. Such metal derivatives can be obtained by the use of alkali metal hydrides in suitable solvents (for example, anhydrous dimethyl formamide).

The yields from this process are generally small and the isolation of the products obtained is troublesome, especially when the large amount of solvent used is taken into consideration.

The present invention provides mixed anhydrides of the formula:

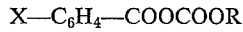
X—C₆H₄—COOCOOR wherein X is hydrogen or a halogen and R an alkyl group having from 1 to 5 carbon atoms, are prepared by the novel process of reacting an ester of an halocarbonic acid with an amine, preferably a tertiary amine, salt of the benzoic acid.

Preferred mixed anhydrides are of the formula:

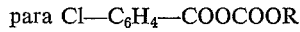
para Cl—C₆H₄—COOCOOR

R having the above-mentioned meaning, are prepared by reacting an ester of chlorocarbonic acid with the triethylamine salt of p-chlorobenzoic acid in solution in a common solvent.

Such solvents are acetone, toluene or xylene and so forth.

The present invention provides a process for the arylation of indole or its derivatives comprising reacting indole or its derivatives with a novel mixed anhydride of a benzoic acid optionally substituted by a halogen atom, and a monoester of carbonic acid, optionally in the presence of an organic base catalyst.

According to a preferred embodiment of the present invention there is provided a process comprising reacting a mixed anhydride of p-chlorobenzoic acid and a monoester of carbonic acid with an indole derivative.

These processes are considerably simpler to operate and give good yields.

The benzoylation of the indole derivatives with heterocyclic nitrogen is carried out according to the invention by reacting a mixed anhydride thus obtained, preferably in excess, with the indole derivative with or without solvent and with use of organic bases as catalyst.

The process has the advantage that it does not give any undesired side reactions with the indole, and it makes it possible to obtain products of great purity in good yield. In addition, the isolation of the end products from the reaction mixture is very simple.

The following examples illustrate the process according to the invention.

EXAMPLE 1

A solution of 9.6 ml. of ethylchloroform (ethyl chlorocarbonate) in 25 ml. of anhydrous toluene is dropped into a solution of 15.6 g. of p-chlorobenzoic acid and 14 ml. of triethylamine in 100 ml. of anhydrous toluene at a temperature between −10° and −5° C.

The suspension obtained is stirred at the same temperature for 2 hours. The triethylamine hydrochloride which separates is filtered off, the solvent is distilled off in vacuo, and the oily residue is taken up in 50 ml. of anhydrous cyclohexane. Any precipitate which may form is filtered off, the solvent is removed in vacuo and 20 g. of an oil are obtained which consists of the crude mixed anhydride of p-chlorobenzoic acid and ethylcarbonic acid and can be used without further purification.

EXAMPLE 2

A mixture of 2.35 g. of indole and 13.7 g. of the mixed anhydride obtained according to Example 1 is treated with 0.1 ml. of triethylamine, gradually heated to 110° C., and maintained at this temperature until evolution of gas has ceased. After cooling, the mass is taken up in acetone, filtered, the solvent evaporated in vacuo, and the residue is taken up in n-hexane.

After recrystallising from ethanol (95°), 4 g. of 1-(p-chlorobenzoyl)-indole are obtained in the form of a white crystalline solid of melting point 113° to 115° C., which corresponds to a yield of 80%.

Analysis for C₁₅H₁₀ClNO.—Found (percent): C, 70.1; H, 4.0; Cl, 13.7. Calculated (percent): C, 70.6; H, 3.9; Cl, 13.8.

EXAMPLE 3

A mixture of 2.5 g. of the ethyl ester of 2-methyl-5-methoxy-3-indolylacetic acid and 10 g. of the mixed anhydride obtained according to Example 1 is treated with 0.2 ml. of triethylamine and slowly heated to 200° C. until evolution of gas has completely ceased. After cooling, the mass is taken up in acetone, filtered and the solvent is evaporated in vacuo, and the residue is distilled with steam. The oily residue is cooled, extracted with benzene, and the solution is dried and allowed to percolate over an aluminum oxide column. After evaporation of the solvent and recrystallisation of the residue from cyclohexane, 2.7 g. of the ethyl ester of 1-(p-chlorobenzoyl)-2-methyl - 5 - methoxy-3-indolylacetic acid are obtained, which is present in the form of a yellow crystalline solid of melting point 94° to 96° C. The yield amounts to 70%.

Analysis for C₂₁H₂₀ClNO₄.—Found (percent): C, 65.1; H, 5.3; Cl, 9.1. Calculated (percent): C, 65.5; H, 5.2; Cl, 9.2.

EXAMPLE 4

A mixture of 2 g. of the tert.-butyl ester of 2-methyl-5-methoxy-3-indolylacetic acid and 8 g. of the mixed anhydride obtained according to Example 1 is treated with 0.2 ml. of triethylamine and slowly heated to 200° C. untill the evolution of gas is complete. After cooling, the mass is taken up in acetone, the solution is filtered, the solvent is evaporated in vacuo and the residue is taken up in n-pentane. 2.4 g. of a crystalline product are obtained.

1-(p-chlorobenzoyl) - 2 - methyl - 5 - methoxy-3-indolyl-acetic acid of melting point 153° to 154° C. is obtained by extraction in the hot with isopropyl ether, evaporation of the solvent and crystallisation of the residue from aqueous methanol.

Analysis for C₁₉H₁₆ClNO₄.—Found (percent): C, 63.5; H, 4.6; Cl, 9.8. Calculated (percent): C, 63.7; H, 4.5; Cl, 9.9.

We claim:
1. A process for the preparation of an N-benzoylindole compound of the formula

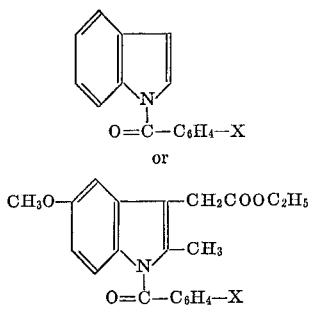

which comprises heating the corresponding unbenzoylated indole with a mixed benzoic-carbonic anhydride of the formula X—C$_6$H$_4$—COOCOOR, wherein X is hydrogen or halogen and R is an alkyl group having from 1 to 5 carbon atoms, until the evolution of gas is complete.

2. A process for the preparation of 1-(p-chlorobenzoyl)-2-methyl-5-methoxy-4-indolylacetic acid which comprises heating the t-butyl ester of 2-methyl-5-methoxy-3-indolylacetic acid with a mixed benzoic anhydride of the formula p—Cl—C$_6$H$_4$—COOCOOR, wherein R is an alkyl group having 1 to 5 carbon atoms, until the evolution of gas is complete.

References Cited

UNITED STATES PATENTS 3,445,479   5/1969   Hydorn _____ 260—326.16
3,501,465   3/1970   Shen et al. _____ 260—326.16 X ALEX MAZEL, Primary Examiner J. A. NARCAVAGE, Assistant Examiner U.S. Cl. X.R.

260—326.16, 548